United States Patent
Song et al.

(10) Patent No.: US 6,867,714 B2
(45) Date of Patent: Mar. 15, 2005

(54) METHOD AND APPARATUS FOR ESTIMATING A MOTION USING A HIERARCHICAL SEARCH AND AN IMAGE ENCODING SYSTEM ADOPTING THE METHOD AND APPARATUS

(75) Inventors: Byung-cheol Song, Gyeonggi-do (KR); Kang-wook Chun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/617,228

(22) Filed: Jul. 11, 2003

(65) Prior Publication Data
US 2004/0013201 A1 Jan. 22, 2004

(30) Foreign Application Priority Data
Jul. 18, 2002 (KR) ................. 10-2002-0041985

(51) Int. Cl.⁷ .............................................. H03M 7/00
(52) U.S. Cl. ..................... 341/61; 375/240.16
(58) Field of Search ............. 341/61, 51, 50; 375/240.16

(56) References Cited

U.S. PATENT DOCUMENTS 6,160,850 A    12/2000  Chen et al.
6,690,730 B2 *  2/2004  Choi .................. 375/240.16

FOREIGN PATENT DOCUMENTS

KR    2001011309 A  *  2/2001  .......... H04N/7/243

* cited by examiner

Primary Examiner—Jean JeanGlaude
Assistant Examiner—Joseph Lauture
(74) Attorney, Agent, or Firm—Staas & Halsey LLP (57) ABSTRACT

A method and apparatus to estimate a motion using searched motion vectors, and an image encoding system adopting the method and apparatus are provided. The motion between lower level frame data is estimated to obtain search points with minimum Sum of Absolute Differences (SADs). The search points are used as a based motion vector. Searches are performed on both upper level frame data and upper level field data using the based motion vector and search points are obtained with minimum SADs. The search points obtained from the searches on the upper level frame data and upper level field data are used as frame and field motion vectors.

29 Claims, 5 Drawing Sheets

METHOD AND APPARATUS FOR ESTIMATING A MOTION USING A HIERARCHICAL SEARCH AND AN IMAGE ENCODING SYSTEM ADOPTING THE METHOD AND APPARATUS

CROSS-REFERENCE TO RELATED APPLICATIONS

This application claims the priority of Korean Patent Application No. 2002-41985, filed on Jul. 18, 2002, in the Korean Intellectual Property Office, the disclosure of which is incorporated herein in its entirety by reference.

BACKGROUND OF THE INVENTION

1. Field of the Invention

The present invention relates to real-time image encoding systems, and more particularly, to a method and apparatus for estimating a motion using a hierarchical search approach, and an image encoding system using the method and apparatus.

2. Description of the Related Art

Among all elements of a general image encoder, a motion estimator performs the most intensive calculations. A fast motion estimation algorithm can reduce a number of calculations performed in the motion estimator. Also, the fast motion estimation algorithm can execute a computation faster than a full search block matching algorithm without degradation in performance. A solution for fast motion estimation is a hierarchical search approach.

If the hierarchical search approach is applied to MPEG-2 encoders, a frame motion estimation and a field motion estimation must be performed on all level of images into which a frame image is divided.

Figure 1:
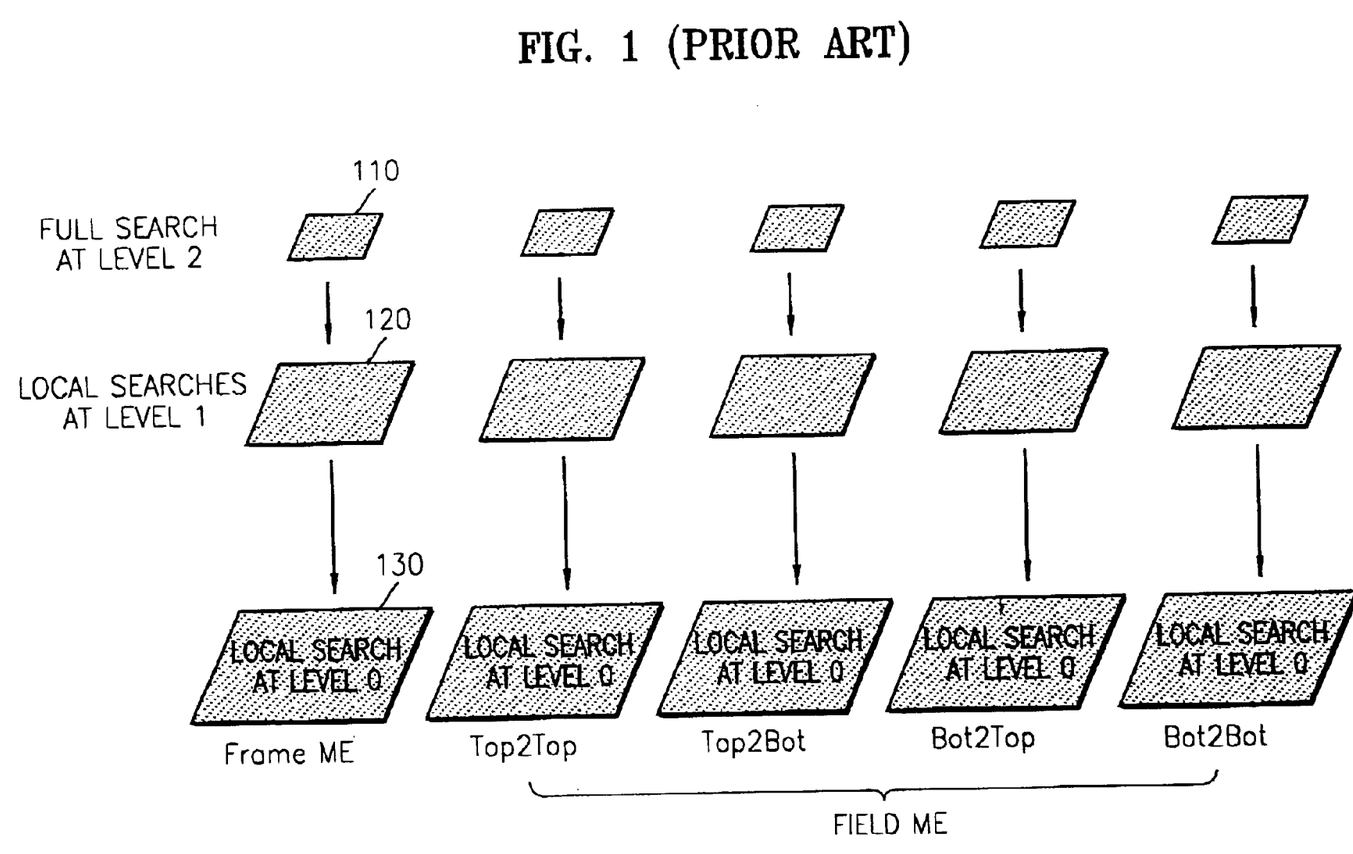
FIG. 1 is a conceptual diagram illustrating a hierarchical search approach applied to a conventional MPEG-2 encoder.

FIG. 1 is a conceptual diagram illustrating the hierarchical search approach applied to a conventional MPEG-2 encoder. Referring to FIG. 1, a current frame and a reference (or previous) frame form a hierarchical structure through subsampling. In a three-stage hierarchical search approach, the current and reference frames each includes a lowest resolution level (level 2) image 110, an intermediate resolution level (level 1) image 120, and a highest resolution level (level 0) image 130.

Hierarchical motion estimation on the hierarchical frame structure begins by initiating a full search on the level 2 image 110 and obtaining initial search points with a minimum Sum of Absolute Differences (SADs). Next, local searches are performed on the level 1 image 120 based on the initial search points obtained from the level 2 image 110. New initial search points with the minimum SADs are extracted by the local searches performed on the level 1 image 120. Thereafter, the local searches are performed on the level 0 image 130 based on the new initial search points obtained from the level 1 image 120. Consequently, the local searches on the level 0 image 130 obtain final motion vectors.

Hence, when the MPEG-2 encoder processes prediction frames (P-frames), five hierarchical searches are performed on frames and fields, that is, between frames, on top to top (Top2Top) fields, on top to bottom (Top2Bot) fields, on bottom to top (Bot2Top) fields, and on bottom to bottom (Bot2Bot) fields. When the MPEG-2 encoder processes bidirectional frames (B-frames), a total of 10 hierarchical searches are performed on the B-frames by including forward and backward searches. Accordingly, during the motion estimation in the MPEG-2 encoder, an application of such hierarchical motion searches requires extra memory for use upon both frame and field motion estimations, and demands intensive computation.

SUMMARY OF THE INVENTION

The present invention provides a motion estimation method and apparatus to minimize computation during a field motion estimation, while adopting a general hierarchical search approach used in MPEG-2 encoders.

The present invention also provides an image encoding system adopting the motion estimation method and apparatus.

According to an aspect of the present invention, there is provided a method of estimating a motion of an image of frames organized into a hierarchical structure. In the method, searches are performed on lower level frame data using initial search points to obtain search points with minimum Sum of Absolute Difference (SADs), and the search points with SADs are used as a based motion vector. Then, searches are performed on both upper level frame data and upper level field data using the based motion vector to obtain search points with minimum SADs. The search points with SADs are used as frame and field motion vectors.

According to another aspect of the present invention, there is provided an apparatus to estimate a motion of an image of frames organized into a hierarchical structure. The apparatus includes a pre-processor and first and second motion estimation units. The pre-processor performs lowpass filtering and subsampling on a current frame and a reference (previous) frame to organize the current frame and the reference frame into the hierarchical structure. The first motion estimation unit performs a search on frame data obtained by the pre-processor at a low resolution level and searches for at least one initial search point with a minimum Sum of Absolute Difference (SAD). The second motion estimation unit sets initial search points as based frame and field motion vectors and performs a search on the frame data obtained by the pre-processor at a high resolution level by using the based frame and field motion vectors to estimate frame and field motion vectors with minimum SADs.

According to an aspect of the present invention, there is provided an apparatus to estimate a motion of an image of frames organized into a hierarchical structure, the apparatus including a discrete cosine transform (DCT) unit performing a discrete cosine transform (DCT) function on the image; a quantization (Q) unit quantizing the DCT function image; a dequantization unit dequantizing the quantized image; an inverse DCT (IDCT) unit performing an inverse discrete cosine transform (IDCT) on the dequantized image; a frame memory (FM) storing the IDCT image on a frame-by-frame basis; a motion estimation (ME) unit forming a hierarchical frame structure by sampling image data of a current frame and the image data of a previous frame stored in the FM, and performing a frame motion estimation by applying based motion vectors (MVs); and a variable length coding (VLC) unit removing statistical redundancy from the quantized image based on the MVs estimated by the ME unit.

According to an aspect of the present invention, there is provided a method to estimate a motion of an image of frames organized into a hierarchical structure, the method including: performing a discrete cosine transform (DCT) function on the image; quantizing the DCT function image; dequantizing the quantized image; performing an inverse discrete cosine transform (IDCT) on the dequantized image; storing the IDCT image on a frame-by-frame basis; forming a hierarchical frame structure by sampling image data of a current frame and the image data of a previous frame stored, and performing a frame motion estimation by applying based motion vectors (MVs); and removing statistical redundancy from the quantized image based on the MVs estimated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Reference will now be made in detail to the aspects of the present invention, examples of which are illustrated in the accompanying drawings, wherein like reference numerals refer to like elements throughout. The aspects are described below in order to explain the present invention by referring to the figures.

Figure 2:
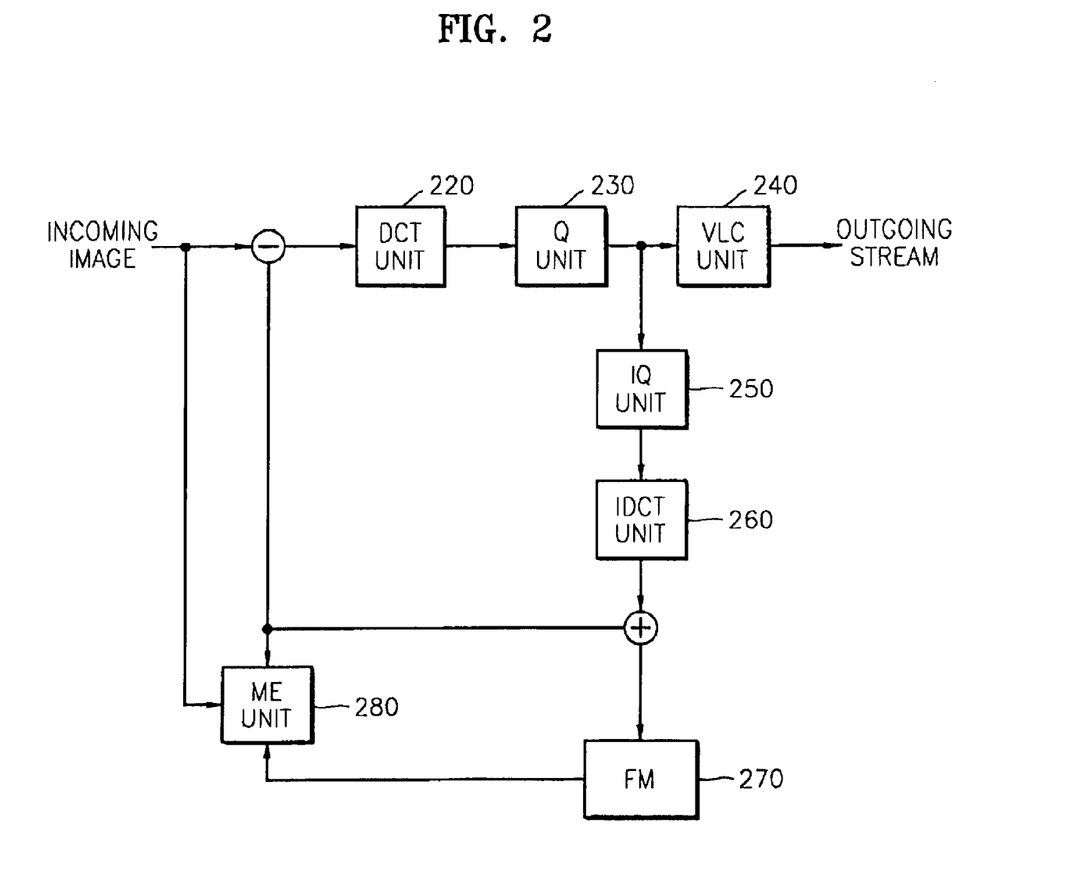
FIG. 2 is a block diagram of an image encoding system, according to an aspect of the present invention.

Referring to FIG. 2, an incoming image corresponds to a group of picture (GOP). A discrete cosine transform (DCT) unit 220 performs a discrete cosine transform (DCT) function on 8×8 blocks to obtain spatial redundancy from the incoming image.

A quantization (Q) unit 230 quantizes the DCT function image. A dequantization unit 250 dequantizes the quantized image.

An inverse DCT (IDCT) unit 260 performs IDCT on the dequantized image. A frame memory (FM) 270 stores the IDCT image on a frame-by-frame basis.

A motion estimation (ME) unit 280 forms a hierarchical frame structure by sampling image data of a current frame and the image data of a previous frame stored in the FM 270, and performs a motion estimation by applying based motion vectors, obtained from a level 1 image (refer to FIG. 1), to both the frames and fields.

A variable length coding (VLC) unit 240 removes statistical redundancy from the quantized image based on motion vectors (MV) estimated by the ME unit 280.

Figure 3:
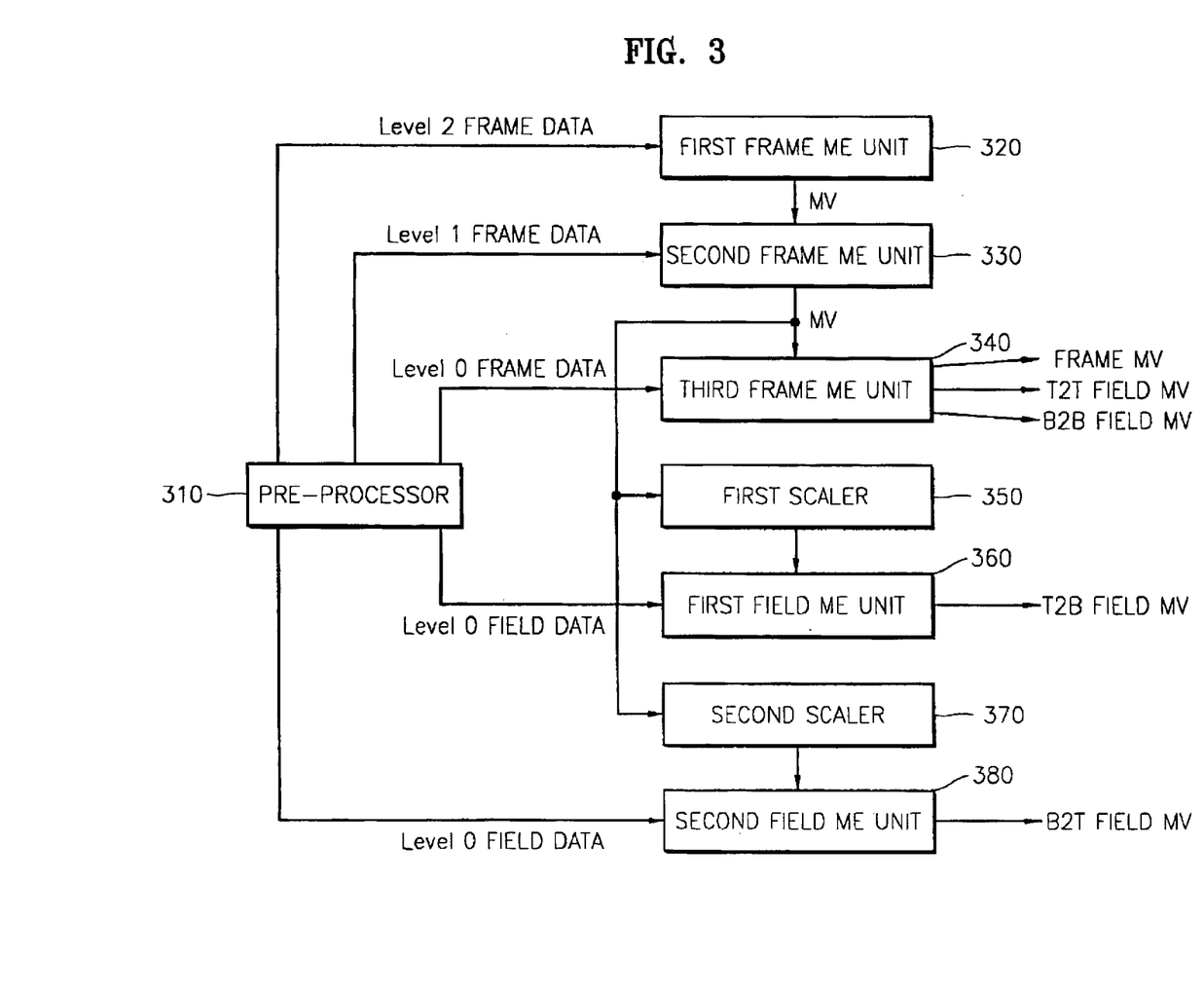
FIG. 3 is a block diagram of the motion estimation (ME) unit of FIG. 2.

FIG. 3 is a block diagram of the ME unit 280 of FIG. 2 in greater detail. Referring to FIG. 3, a pre-processor 310 performs low-pass filtering (LPF) on the current frame and the reference (previous) frame and organizes each of the current and reference frames in the hierarchical structure through sub-sampling. In a three-stage hierarchical search approach, each of the current and reference frames includes lowest resolution level (level 2) frame data, intermediate resolution level (level 1) frame data, and highest resolution level (level 0) frame data. The highest resolution level (level 0) frame data is the original image, the intermediate resolution level (level 1) frame data has ½ of a width and ½ of a length of the original image, and the lowest resolution level (level 2) frame data has ¼ the width and ¼ the length of the original image.

A first frame ME unit 320 initiates frame motion estimation by performing a full search on the pre-processed lowest resolution level (level 2) frame data and finding at least one initial search point (motion vector) with a minimum Sum of Absolute Difference (SAD).

A second frame ME unit 330 continues the frame motion estimation by searching the pre-processed intermediate resolution level (level 1) frame data using the initial motion vectors (MVs), and by finding the initial MVs with the minimum SADs. These initial MVs obtained from the intermediate resolution level (level 1) frame data are referred to as based MVs.

A third frame ME unit 340 involves both the frame motion estimation and the field motion estimation by performing local searches on the highest resolution level (level 0) frame data, using the based MVs. Then, the third frame ME unit 340 finds frame MVs with the minimum SADs, and field MVs between identical fields that have the minimum SADs. The MVs from a current top field to a previous top field are referred to as Top2Top field MVs. The MVs from the current top field to a previous bottom field are referred to as Top2Bot field MVs. The MVs from a current bottom field to the previous top field are referred to as Bot2Top field MVs. The MVs from the current bottom field to the previous bottom field are referred to as Bot2Bot field MVs. Extra computations are not required to obtain the Top2Top and the Bot2Bot field MVs because the Top2Top and the Bot2Bot field MVs can be obtained based on inter-field SADs automatically obtained upon frame motion estimation.

A first scaler 350 scales the based MVs using a distance between the top field of the current frame and the bottom field of the previous frame.

A first field ME unit 360 performs field motion estimation with local searches between the top field of the current frame and the bottom field of the previous frame. The searches occur at the highest resolution level (level 0) using the based MVs scaled by the first scaler 350 and the Top2Bot field MV is obtained with the minimum SAD.

A second scaler 370 scales the based MVs using the distance between the bottom field of the current frame and the top field of the previous frame.

A second field ME unit 380 performs the field motion estimation with local searches on the bottom and top fields of the current and previous frames, respectively. The searches occur at the highest resolution level (level 0) using the based MVs scaled by the second scaler 370 and the Bot2Top field MV is obtained with the minimum SAD.

Figure 4:
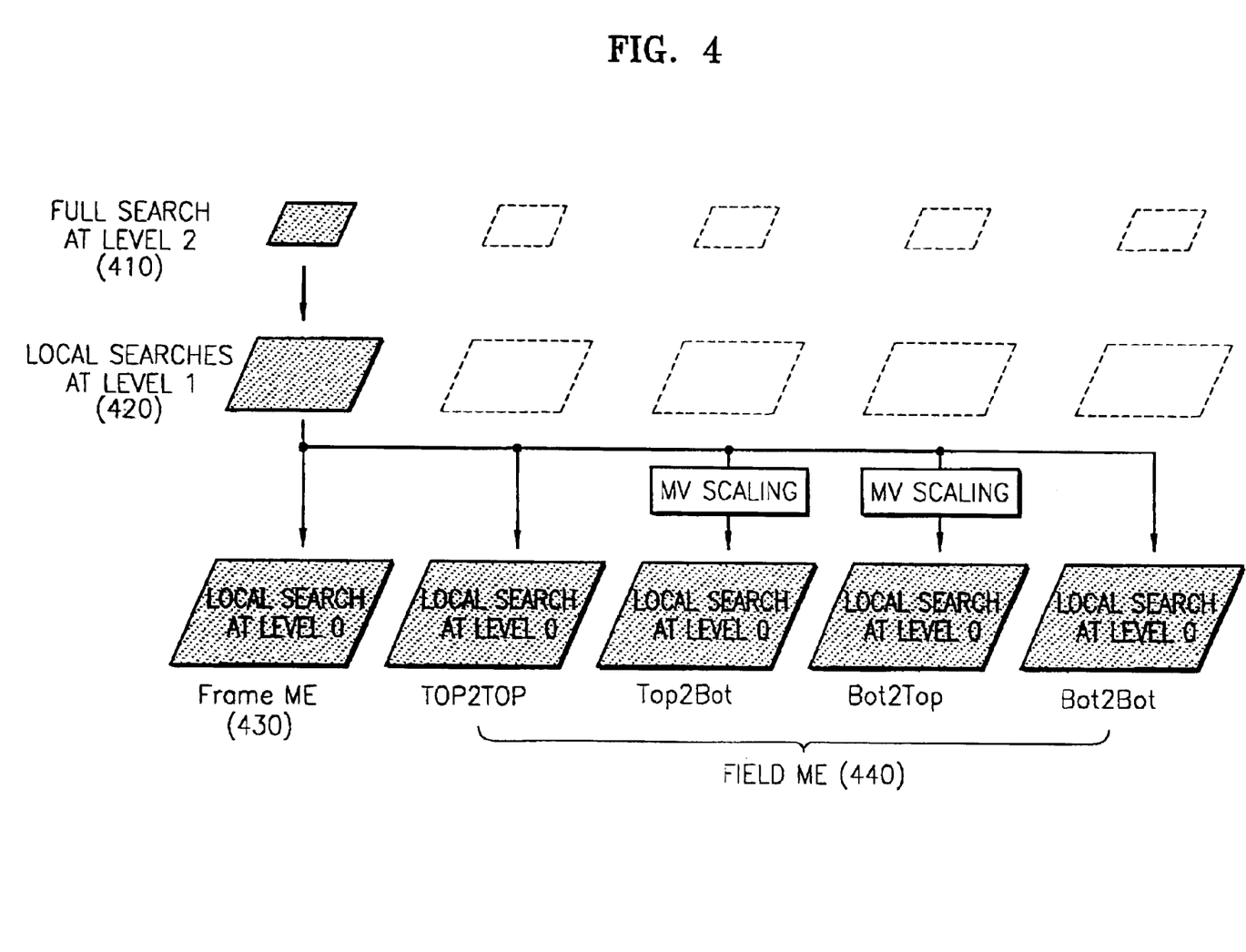
FIG. 4 is a flowchart illustrating a hierarchical motion estimation method, according to an aspect of the present invention.

FIG. 4 is a flowchart illustrating a hierarchical motion estimation method, according to an aspect of the present invention. First, the current frame and the previous frame are each organized in the hierarchical structure by the LPF and the subsampling.

Next, at operation 410, the frame motion estimation occurs with a full search at the lowest resolution level (level 2), extracting at least one initial search point (i.e., initial MV) with the minimum SAD.

Thereafter, at operation 420, the frame motion estimation occurs with local searches using the extracted initial MVs at the intermediate resolution level (level 1), obtaining a frame MV with a minimum SAD. A frame-by-frame MV obtained at the intermediate resolution level (level 1) is referred to as the based MV.

Then, at operations 430 and 440, the frame motion estimation and the field motion estimation occur with local searches at the highest resolution level (level 0) using the based MV, estimating both the frame MVs with the minimum SADs and the field MVs with the minimum SADs.

The Top2Top and Bot2Bot field MVs are estimated with reference to inter-field SADs automatically obtained upon frame motion estimation. During the Top2Bot and Bot2Top field motion estimations, the based MV cannot be applied without change, because the distance between top and bottom fields differs from the distance between the top fields and between the bottom fields. Accordingly, the Top2Bot and Bot2Top field motions are estimated by local searches based on a new based MV, scaled in consideration of the distance between corresponding fields. Through the local searches, the Top2Bot and Bot2Top field MVs with the minimum SADs are obtained.

To sum up, instead of performing searches at the lowest and intermediate resolution levels (levels 2 and 1) to achieve a field motion estimation, local searches are performed at the highest resolution level (level 0) using the search points (i.e., MVs) obtained by the frame motion estimation at the intermediate resolution level (level 1).

Figure 5:
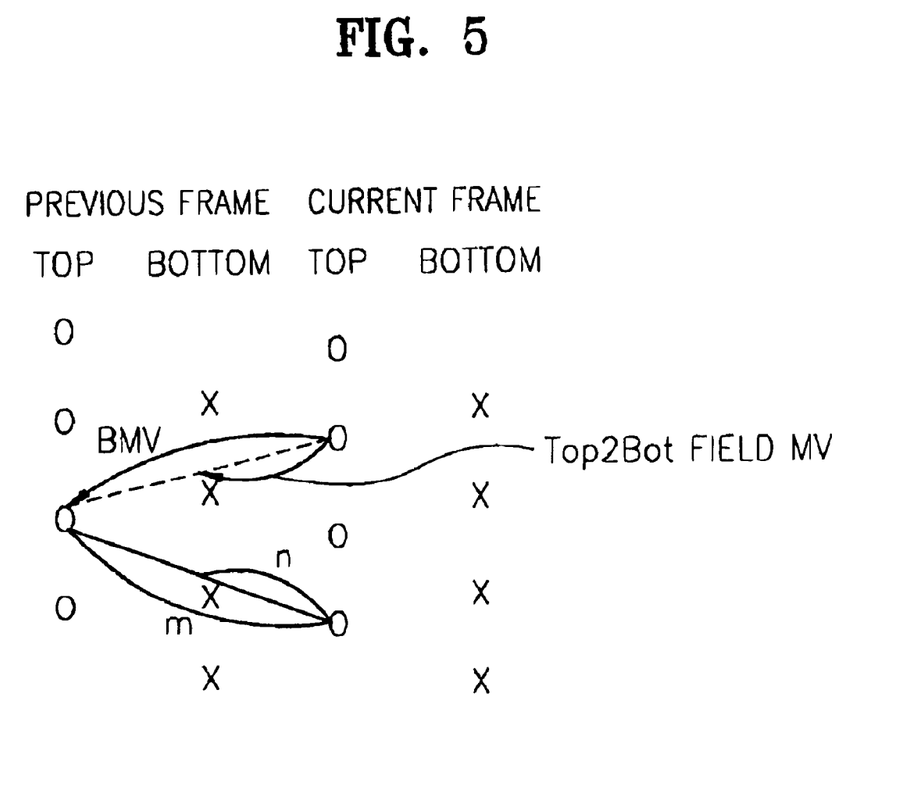
FIG. 5 illustrates an aspect of scaling a based motion vector (BMV) to estimate a motion vector (MV) from top to bottom fields (i.e., a Top2Bot field MV).

FIG. 5 illustrates an aspect of scaling the based MV to estimate the MV between the bottom and top fields (i.e., a Top2Bot field MV). Referring to FIG. 5, it is assumed that each current and previous frame has the top field and the bottom field. If a distance between identical fields (e.g., between top fields or between bottom fields) is m, a distance between different fields (e.g., between bottom and top fields) is n, and a based MV is BMV, the Top2Bot field MV can be estimated as BMV×n/m. In addition, an offset, which considers field characteristics, is added to the scaled BMV. A Bot2Top field MV can be obtained in a way similar to the estimation of the Top2Bot field MV.

While the present invention has been particularly shown and described with reference to exemplary aspects thereof, it will be understood by those of ordinary skill in the art that various changes in form and details may be made therein without departing from the spirit and scope of the present invention as defined by the following claims. The invention can also be embodied as computer readable codes on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and so on. Also, the computer readable code can be transmitted via a carrier wave such as the Internet. The computer readable recording medium can also be distributed over a computer system network so that the computer readable code is stored and executed in a distributed fashion.

As described above, when an MPEG-2 encoder adopts a hierarchical search approach, a based MV obtained from an intermediate resolution level (level 1) is applied to a frame motion estimation and a field motion estimation, thus, reducing an amount of computation required for motion estimation.

What is claimed is:

1. A method of estimating a motion of an image of frames organized into a hierarchical structure, the method comprising:

performing searches on lower level frame data using initial search points to obtain search points with minimum Sum of Absolute Difference (SADs) and using the search points with the minimum SADs as a based motion vector; and performing searches on upper level frame data and upper level field data using the based motion vector to obtain the search points with the minimum SADs and using the search points with the minimum SADs as frame and field motion vectors.

2. The method of claim 1, wherein in obtaining the frame and field motion vectors, top to top (Top2Top) and bottom to bottom (Bot2Bot) field motion vectors are estimated with reference to inter-field SADs obtained upon frame motion estimation, the based motion vector is scaled, and searches based on the scaled based motion vector are performed on top to bottom (Top2Bot) and bottom to top (Bot2Top) fields to obtain motion vectors with the minimum SADs.

3. The method of claim 2, wherein the based motion vector is scaled according to a scaling coefficient which considers a distance between fields.

4. The method of claim 3, wherein if the distance between identical fields is m, the distance between different fields is n, and the based motion vector is BMV, the Top2Bot and Bot2Top field motion vectors are BMV×n/m.

5. An apparatus to estimate a motion of an image of frames organized into a hierarchical structure, the apparatus comprising:

a pre-processor performing low-pass filtering and sub-sampling on a current frame and a reference (previous) frame to organize the current frame and the reference frame into a hierarchical structure;

a first motion estimation unit performing a search on frame data obtained by the pre-processor at a low resolution level and searching for at least one initial search point with a minimum Sum of Absolute Difference (SAD); and a second motion estimation unit setting the at least one initial search point as a based frame and field motion vectors and performing the search on the frame data obtained by the pre-processor at a high resolution level by using the based frame and field motion vectors to estimate frame motion vectors and the field motion vectors with the minimum SADs.

6. The apparatus of claim 5, wherein the second motion estimation unit comprises:

a frame motion estimation unit performing frame and field searches on the high resolution level frame data by using the motion vectors obtained from the low resolution level frame data to estimate the frame motion vectors with the minimum SADs and top to top (Top2Top) and bottom to bottom (Bot2Bot) field motion vectors with the minimum SADs;

a first scaler scaling the based motion vector, depending on a distance between a top field of the current frame and a bottom field of the previous frame;

a first field motion estimation unit performing vertical and horizontal local searches on the top to bottom fields at the high resolution level by using the based motion vector scaled by the first scaler to estimate a top to bottom (Top2Bot) field motion vector with the minimum SAD;

a second scaler scaling the based motion vector, depending on the distance between the bottom field of the current frame and the top field of the previous frame;

a second field motion estimation unit performing vertical and horizontal local searches on the bottom to top fields at the high resolution level by using the based motion vector scaled by the second scaler to obtain a bottom to top (Bot2Top) field motion vector with the minimum SAD.

7. An image encoding system, comprising:

a discrete cosine transform (DCT) unit performing a DCT on incoming image data;

a quantization unit quantizing the DCT image data;

a dequantization unit dequantizing the quantized image data;

an inverse DCT (IDCT) unit performing IDCT on the dequantized image data;

frame memory storing the IDCT image data on a frame-by-frame basis;

a motion estimation unit sampling the image data of a current frame and the image data of a previous frame stored in the frame memory resulting in a hierarchical structure for each frame, and estimating frame and field motion vectors at a high resolution level based on motion vectors obtained from frame data at a low resolution level; and a variable length coding unit removing statistical redundancy from the quantized image data using the motion vectors estimated by the motion estimation unit.

8. An apparatus to estimate a motion of an image of frames organized into a hierarchical structure, the apparatus comprising:

a discrete cosine transform (DCT) unit performing a discrete cosine transform (DCT) function on the image;

a quantization (Q) unit quantizing the DCT function image;

a dequantization unit dequantizing the quantized image;

an inverse DCT (IDCT) unit performing an inverse discrete cosine transform (IDCT) on the dequantized image;

a frame memory (FM) storing the IDCT image on a frame-by-frame basis;

a motion estimation (ME) unit forming a hierarchical frame structure by sampling image data of a current frame and the image data of a previous frame stored in the FM, and performing a frame motion estimation by applying based motion vectors (MVs); and a variable length coding (VLC) unit removing statistical redundancy from the quantized image based on the MVs estimated by the ME unit.

9. The apparatus of claim 8, wherein the ME unit comprises:

a pre-processor performing low-pass filtering (LPF) on the current frame and the previous frame and organizing each of the current and reference frames in the hierarchical structure through sub-sampling.

10. The apparatus of claim 9, wherein, in a three-stage hierarchical search approach, each of the current and reference frames comprises lowest resolution level (level 2) frame data, intermediate resolution level (level 1) frame data, and highest resolution level (level 0) frame data.

11. The apparatus of claim 10, wherein the highest resolution level (level 0) frame data is the original image, the intermediate resolution level (level 1) frame data has ½ of a width and ½ of a length of the original image, and the lowest resolution level (level 2) frame data has ¼ of the width and ¼ of the length of the original image.

12. The apparatus of claim 10, wherein the ME unit comprises:

a first frame ME unit initiating the frame motion estimation by performing a full search on the lowest resolution level (level 2) frame data and finding at least one initial MV with a minimum Sum of Absolute Difference (SAD);

a second frame ME unit performing local searches on the intermediate resolution level (level 1) frame data using the at least one initial MV, and by finding the initial MVs with the minimum SADs, wherein the initial MVs obtained from the intermediate resolution level (level 1) frame data comprise based MVs; and a third frame ME unit providing the frame motion estimation and a field motion estimation by searching the highest resolution level (level 0) frame data using the based MVs, and finding frame MVs with the minimum SADs, and field MVs between identical fields that have the minimum SADs.

13. The apparatus of claim 9, wherein Top2Top field MVs are the MVs from a current top field to a previous top field.

14. The apparatus of claim 9, wherein Top2Bot field MVs are the MVs from the current top field to a previous bottom field.

15. The apparatus of claim 9, wherein Bot2Top field MVs are the MVs from a current bottom field to the previous top field.

16. The apparatus of claim 9, wherein Bot2Bot field MVs are the MVs from the current bottom field to the previous bottom field.

17. The apparatus of claim 9, wherein the Top2Top and the Bot2Bot field MVs are obtained based on inter-field SADs obtained from a frame motion estimation.

18. The apparatus of claim 9, wherein the ME unit comprises:

a first scaler scaling the based MVs using a distance between a top field of the current frame and a bottom field of the previous frame;

a first field ME unit performing field motion estimation with local searches between the top field of the current frame and the bottom field of the previous frame;

a second scaler scaling the based MVs using the distance between the bottom field of the current frame and the top field of the previous frame; and a second field ME unit performing the field motion estimation with the local searches on the bottom and top fields of the current and previous frames, respectively.

19. A method to estimate a motion of an image of frames organized into a hierarchical structure, the method comprising:

performing a discrete cosine transform (DCT) function on the image;

quantizing the DOT function image;

dequantizing the quantized image;

performing an inverse discrete cosine transform (IDCT) on the dequantized image:

storing the IDCT image on a frame-by-frame basis;

forming a hierarchical frame structure by sampling image data of a current frame and the image data of a previous frame stored, and performing a frame motion estimation by applying based motion vectors (MVs); and removing statistical redundancy from the quantized image based on the MVs estimated.

20. The method of claim 19, further comprising performing low-pass filtering (LPF) on the current frame and the previous frame and organizing each of the current and reference frames in the hierarchical structure through sub-sampling.

21. The method of claim 20, wherein, in a three-stage hierarchical search approach, each of the current and reference frames comprises lowest resolution level (level 2) frame data, intermediate resolution level (level 1) frame data, and highest resolution level (level 0) frame data.

22. The method of claim 21, wherein the highest resolution level (level 0) frame data is the original image, the intermediate resolution level (level 1) frame data has ½ of a width and ½ of a length of the original image, and the lowest resolution level (level 2) frame data has ¼ of the width and ¼ of the length of the original image.

23. The method of claim 21, further comprising: initiating the frame motion estimation by performing a full search on the lowest resolution level (level 2) frame data and finding at least one initial MV with a minimum Sum of Absolute Difference (SAD);

performing local searches on the intermediate resolution level (level 1) frame data using the at least one initial MV, and by finding the initial MVs with the minimum SADs, wherein the initial MVs obtained from the intermediate resolution level (level 1) frame data comprise based MVs; and providing the frame motion estimation and a field motion estimation by searching the highest resolution level (level 0) frame data using the based MVs, and finding frame MVs with the minimum SADs, and field MVs between identical fields that have the minimum SADs.

24. The method of claim 20, wherein Top2Top field MVs are the MVs from a current top field to a previous top field.

25. The method of claim 20, wherein Top2Bot field MVs are the MVs from the current top field to a previous bottom field.

26. The method of claim 20, wherein Bot2Top field MVs are the MVs from a current bottom field to the previous top field.

27. The method of claim 20, wherein Bot2Bot field MVs are the MVs from the current bottom field to the previous bottom field.

28. The method of claim 20, wherein the Top2Top and the Bot2Bot field MVs are obtained based on inter-field SADs obtained from a frame motion estimation.

29. The method of claim 20, wherein the ME unit comprises:

scaling the based MVs using a distance between a top field of the current frame and a bottom field of the previous frame;

performing field motion estimation with local searches between the top field of the current frame and the bottom field of the previous frame;

scaling the based MVs using the distance between the bottom field of the current frame and the top field of the previous frame; and performing the field motion estimation with the local searches on the bottom and top fields of the current and previous frames, respectively.

* * * * *

UNITED STATES PATENT AND TRADEMARK OFFICE
CERTIFICATE OF CORRECTION

PATENT NO.    : 6,867,714 B2
DATED         : March 15, 2005
INVENTOR(S)   : Byung-cheol Song et al.

It is certified that error appears in the above-identified patent and that said Letters Patent is hereby corrected as shown below:

Column 8,
Line 52, change "DOT" to -- DCT --;
Line 63, insert paragraph break after "comprising".

Column 9,
Line 12, insert paragraph break after "comprising".

Signed and Sealed this

Twenty-ninth Day of November, 2005

JON W. DUDAS
*Director of the United States Patent and Trademark Office*